United States Patent
Xu

(10) Patent No.: US 12,468,652 B2
(45) Date of Patent: Nov. 11, 2025

(54) SERIAL PERIPHERAL INTERFACE COMPATIBILITY EXTENSION SWITCHING METHOD AND EMBEDDED SYSTEM USING THE SAME

(71) Applicant: Generalplus Technology Inc., Hsinchu (TW)

(72) Inventor: Shu-Ming Xu, Hsinchu (TW)

(73) Assignee: GENERALPLUS TECHNOLOGY INC., Hsinchu (TW)

( * ) Notice: Subject to any disclaimer, the term of this patent is extended or adjusted under 35 U.S.C. 154(b) by 92 days.

(21) Appl. No.: 18/076,624

(22) Filed: Dec. 7, 2022

(65) Prior Publication Data

US 2023/0350837 A1    Nov. 2, 2023

(30) Foreign Application Priority Data

Apr. 27, 2022    (TW) .................... 111116076

(51) Int. Cl.
*G06F 13/42* (2006.01)
*G06F 13/10* (2006.01)

(52) U.S. Cl.
CPC ........ *G06F 13/4282* (2013.01); *G06F 13/102* (2013.01)

(58) Field of Classification Search
CPC . G06F 13/4282; G06F 13/102; G06F 13/4291
USPC ............... 710/8, 14, 15, 16, 33, 62, 105
See application file for complete search history.

(56) References Cited

U.S. PATENT DOCUMENTS

| | | | | |
|---|---|---|---|---|
| 5,990,469 | A  * | 11/1999 | Bechtel ............... | G06V 20/584 348/E3.02 |
| 11,042,500 | B1 * | 6/2021 | Guo ................... | G06F 9/30101 |
| 2004/0176857 | A1 * | 9/2004 | Tsunedomi ........ | G05B 19/0421 700/5 |
| 2009/0125657 | A1 * | 5/2009 | Hsieh .................. | G06F 13/102 710/110 |
| 2009/0193165 | A1 * | 7/2009 | Hsieh .................. | G06F 13/4291 710/110 |
| 2010/0262737 | A1 * | 10/2010 | Pan ...................... | G06F 13/24 710/260 |
| 2011/0072297 | A1 * | 3/2011 | Huang ................ | G06F 13/4282 710/110 |
| 2012/0072628 | A1 * | 3/2012 | Crockett ............ | G06F 13/4291 710/110 |
| 2014/0075072 | A1 * | 3/2014 | Alley .................. | G06F 13/4291 710/110 |
| 2017/0083467 | A1 * | 3/2017 | Mishra ............... | G06F 13/4282 |
| 2018/0173651 | A1 * | 6/2018 | Xie ..................... | G06F 13/1689 |
| 2019/0012291 | A1 * | 1/2019 | Biniguer ............ | G06F 13/4295 |
| 2019/0020462 | A1 * | 1/2019 | Suwald .............. | H04L 5/16 |
| 2019/0129638 | A1 * | 5/2019 | Murali ................ | G06F 3/0659 |

(Continued)

*Primary Examiner* — Farley Abad
*Assistant Examiner* — Henry W Yu
(74) *Attorney, Agent, or Firm* — MUNCY, GEISSLER, OLDS & LOWE, P.C.

(57) ABSTRACT

A serial peripheral interface compatibility extension switching method and an embedded system using the same are provided in the present invention. The method includes: performing a reset to a SPI controller; providing a first logic voltage to at least one of the MOSI terminal, the MISO terminal and SPI clock terminal of a SPI port of the SPI controller; and transmitting or receiving data from the SPI port according to an external clock signal.

15 Claims, 12 Drawing Sheets

(56) References Cited

U.S. PATENT DOCUMENTS

2023/0195672 A1\* 6/2023 Wen .................... G06F 13/4027
710/314

\* cited by examiner

SERIAL PERIPHERAL INTERFACE COMPATIBILITY EXTENSION SWITCHING METHOD AND EMBEDDED SYSTEM USING THE SAME

CROSS-REFERENCE TO RELATED APPLICATIONS

This application claims priority of Ser. No. 11/116,076 filed in Taiwan R.O.C. on Apr. 27, 2022 under 35 USC 119, the entire content of which is hereby incorporated by reference.

BACKGROUND OF THE INVENTION

Field of the Invention

The present invention relates to the application technology for serial peripheral interface, more particularly, the present invention relates to a serial peripheral interface compatibility extension switching method and an embedded system using the same.

Description of the Related Art

SPI is an abbreviation of Serial Peripheral Interface. This interface is a high-speed synchronous serial interface designed and developed by Motorola. It was originally applied to its 68xx series of 8-bit processors to connect analog-to-digital converters (ADC), digital analog converters (DAC), electronically erasable rewritable read-only memory (EEPROM), communication and transmission integrated circuits and other peripheral chips. Due to its low pin count, simple structure, fast transmission speed, ease of use, etc., it has become an industry standard. Not only on single-chip microcontrollers, but many new system-on-chip (SoC) directly support multiple sets of serial peripheral interfaces, and even spread to modular products (such as liquid crystal display modules for mobile phones, camera modules) and 3C products (such as memory cards for digital cameras) also adopt serial peripheral interfaces.

FIG. 1 illustrates a system block diagram depicting a serial peripheral interface system of a prior art. Referring to FIG. 1, the serial peripheral interface system includes an SPI microcontroller 101, a serial peripheral interface storage device 102 and a peripheral device 103. Due to the shortage of chips, most products currently use processors without built-in memory, and user programs (User Code) and resources are completely stored in the external serial peripheral interface storage device 102. In this embodiment, the SPI microcontroller 101 is used as the main control chip and reads the user code and the resource from the external serial peripheral interface storage device 102 through the serial peripheral interface.

Due to the lack of internal memory, not only the cost of the chip is reduced, but also the space saved can be used to expand the special functions of input and output (I/O) (such as: 2nd SPI, UART, touch sensing, . . . etc.), and because of its rich functions, SPI microcontroller 101 is often considered as a subsidiary of another main control chip to provide input and output (I/O) or function extension, as shown in FIG. 2, FIG. 2 illustrates a system block diagram depicting a serial peripheral interface system of the prior art. The serial peripheral interface system includes an external processor 201, an SPI microcontroller 101 and a peripheral device 103.

However, because the external processor 201 must provide the programs (User Code and Resources) required by the SPI microcontroller 101 as a SPI slave, and the slowest frequency of the SPI clock of the SPI microcontroller 101 is 5 MHz, that means that the external processor 201 only has about 0.2 uS to determine the memory address sent by the SPI microcontroller 101 and prepare the corresponding information to provide it to the SPI microcontroller 101, which seriously limits the hardware specification of the external processor 201. If the SPI command and memory address issued by SPI microcontroller 101 cannot be parsed immediately and provide its corresponding information, SPI microcontroller 101 will not be considered to serve as an extended IO or extended functions.

BRIEF SUMMARY OF THE INVENTION

In view of this, the present invention is to provide a serial peripheral interface compatibility extension switching method and an embedded system using the same, wherein the serial peripheral interface can determine and switch the master mode and the slave mode, such that the other MCU chip which electrically connected to the serial peripheral interface can be operated at master mode. Therefore, the hardware and performance threshold of the other MCU can be reduced.

In view of this, the present invention provides an embedded system. The embedded system includes a master central process unit and a SPI peripheral device. The master central process unit includes a first serial peripheral interface port, wherein the serial peripheral interface port includes a SPI MOSI terminal, a SPI MISO terminal, a SPI clock terminal and a SPI enable terminal. The SPI peripheral device includes a SPI microcontroller. The SPI microcontroller includes at least a first serial peripheral interface port, wherein the first serial peripheral interface port includes a first SPI MOSI terminal, a first SPI MISO terminal, a first SPI clock terminal and a first SPI enable terminal.

The first SPI MOSI terminal is coupled to the SPI MOSI terminal of the master central process unit. The first SPI MISO terminal is coupled to the SPI MISO terminal of the master central process unit. The first SPI clock terminal is coupled to the SPI clock terminal of the master central process unit. The first SPI enable terminal is coupled to the SPI enable terminal of the master central process unit, wherein the master central process unit is operated at a first operational clock, and the SPI microcontroller is operated at a second operational clock, wherein, when the second SPI enable terminal is disabled, and the SPI microcontroller detect that at least one of the first SPI MOSI terminal, the first SPI MISO terminal and the first SPI clock terminal is a first logic voltage, the first serial peripheral interface port of the SPI microcontroller is set to slave mode such that the SPI microcontroller receives data from the SPI MOSI terminal of the master central process unit according to the first operational clock.

The present invention further provides a serial peripheral interface compatibility extension switching method, adapted for an embedded system, wherein the serial peripheral interface compatibility extension switching method includes: providing a master central process unit, operated at a first operational clock; providing a SPI microcontroller, operated at a second operational clock; performing a power-on reset to the SPI microcontroller; providing a first logic voltage to at least one of a SPI MOSI terminal, a SPI MISO terminal, a SPI clock terminal of a serial peripheral interface port of the SPI microcontroller; and transmitting/receiving data from serial peripheral interface port of the SPI microcontroller according to the first operational clock.

In the serial peripheral interface compatibility extension switching method and the embedded system using the same according to a preferred embodiment of the present invention, the SPI microcontroller further includes a second serial peripheral interface port, includes a second SPI MOSI terminal, a second SPI MISO terminal, a second SPI clock terminal and a plurality of second SPI enable terminal. In a preferred embodiment of the present invention, the second serial peripheral interface port is further coupled to a plurality of slave peripheral device, wherein the $I^{th}$ slave peripheral device is coupled to the $I^{th}$ third SPI enable terminal, wherein I is natural number, and I is smaller than or equal to a number of the second SPI enable terminal.

In the serial peripheral interface compatibility extension switching method and the embedded system using the same according to a preferred embodiment of the present invention, the SPI microcontroller further includes a reset terminal, wherein, when the SPI microcontroller performs a power-on reset, the master central process unit outputs a reset signal to the reset terminal, and outputs the first logic voltage to at least one of the SPI MOSI terminal, the SPI MISO terminal and the SPI clock terminal of the master central process unit.

In the serial peripheral interface compatibility extension switching method and the embedded system using the same according to a preferred embodiment of the present invention, the embedded system further includes a plurality of SPI peripheral device, wherein each SPI peripheral device includes a SPI microcontroller. The SPI microcontroller includes a first serial peripheral interface port and a third serial peripheral interface port, wherein the SPI microcontroller first serial peripheral interface port includes a first SPI MOSI terminal, a first SPI MISO terminal, a first SPI clock terminal and a first SPI enable terminal. The SPI microcontroller third serial peripheral interface port includes a third SPI MOSI terminal, a third SPI MISO terminal, a third SPI clock terminal and a third SPI enable terminal, wherein the first SPI MOSI terminal of the first serial peripheral interface port of the SPI microcontroller of $(J+1)^{th}$ SPI peripheral device is coupled to the third SPI MOSI terminal of the third serial peripheral interface port of the SPI microcontroller of $J^{th}$ SPI peripheral device.

In a preferred embodiment of the present invention, the first SPI MISO terminal of the first serial peripheral interface port of the SPI microcontroller of $(J+1)^{th}$ SPI peripheral device is coupled to the third SPI MISO terminal of the third serial peripheral interface port of the SPI microcontroller of $J^{th}$ SPI peripheral device, wherein the first SPI clock terminal of the first serial peripheral interface port of the SPI microcontroller of $(J+1)^{th}$ SPI peripheral device is coupled to the third SPI clock terminal of the third serial peripheral interface port of the SPI microcontroller of $J^{th}$ SPI peripheral device, wherein the first SPI enable terminal of the first serial peripheral interface port of the SPI microcontroller of $(J+1)^{th}$ SPI peripheral device is coupled to the third SPI enable terminal of the third serial peripheral interface port of the SPI microcontroller of $J^{th}$ SPI peripheral device, wherein J is natural number, and J is smaller than a number of the SPI peripheral device.

In the serial peripheral interface compatibility extension switching method and the embedded system using the same according to a preferred embodiment of the present invention, the SPI microcontroller of each SPI peripheral device further comprises a reset terminal, wherein, when the embedded system is started, the SPI microcontroller of $J^{th}$ SPI peripheral device outputs a reset signal to the reset terminal of the SPI microcontroller of $(J+1)^{th}$ SPI peripheral device, and one of the third SPI MOSI terminal, the third SPI MISO terminal and the third SPI clock terminal of the SPI microcontroller of the $J^{th}$ SPI peripheral device outputs the first logic voltage. In a preferred embodiment of the present invention, the first SPI MOSI terminal of the first serial peripheral interface port of the SPI microcontroller is coupled to a second logic voltage holding circuit, wherein, when a circuit coupled to the first SPI MOSI terminal is high impedance, the first SPI MOSI terminal of the first serial peripheral interface port of the SPI microcontroller is set to a second logic voltage.

The essence of the invention is to determine whether the SPI microcontroller is converted into the master mode or the slave mode according to the logic state of the input/output terminals of the serial peripheral interface when the serial peripheral interface is not selected. When the SPI microcontroller is coupled to other control chip, the other chips can work in the serial peripheral interface master mode, and the hardware and performance thresholds of the other chip are reduced. Therefore, the compatibility of the device can be increased.

The above-mentioned and other objects, features and advantages of the present invention will become more apparent from the following detailed descriptions of preferred embodiments thereof taken in conjunction with the accompanying drawings.

DETAILED DESCRIPTION OF THE INVENTION

Figure 1:
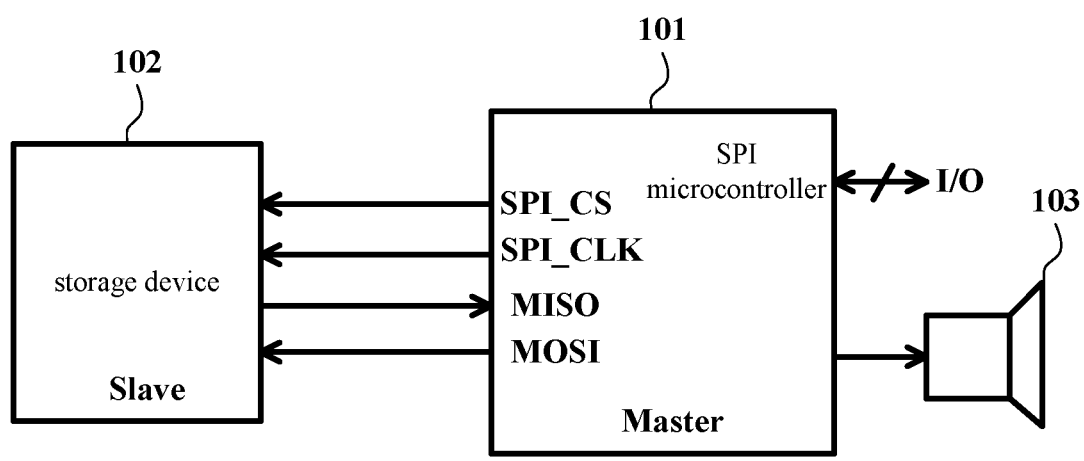
FIG. 1 illustrates a system block diagram depicting a serial peripheral interface system of a prior art.
Figure 2:
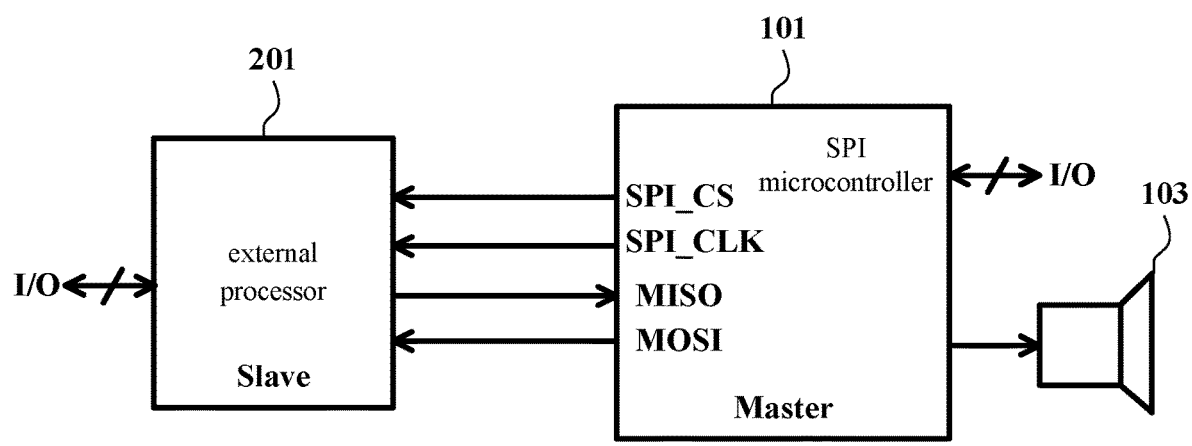
FIG. 2 illustrates a system block diagram depicting a serial peripheral interface system of a prior art.
Figure 3:
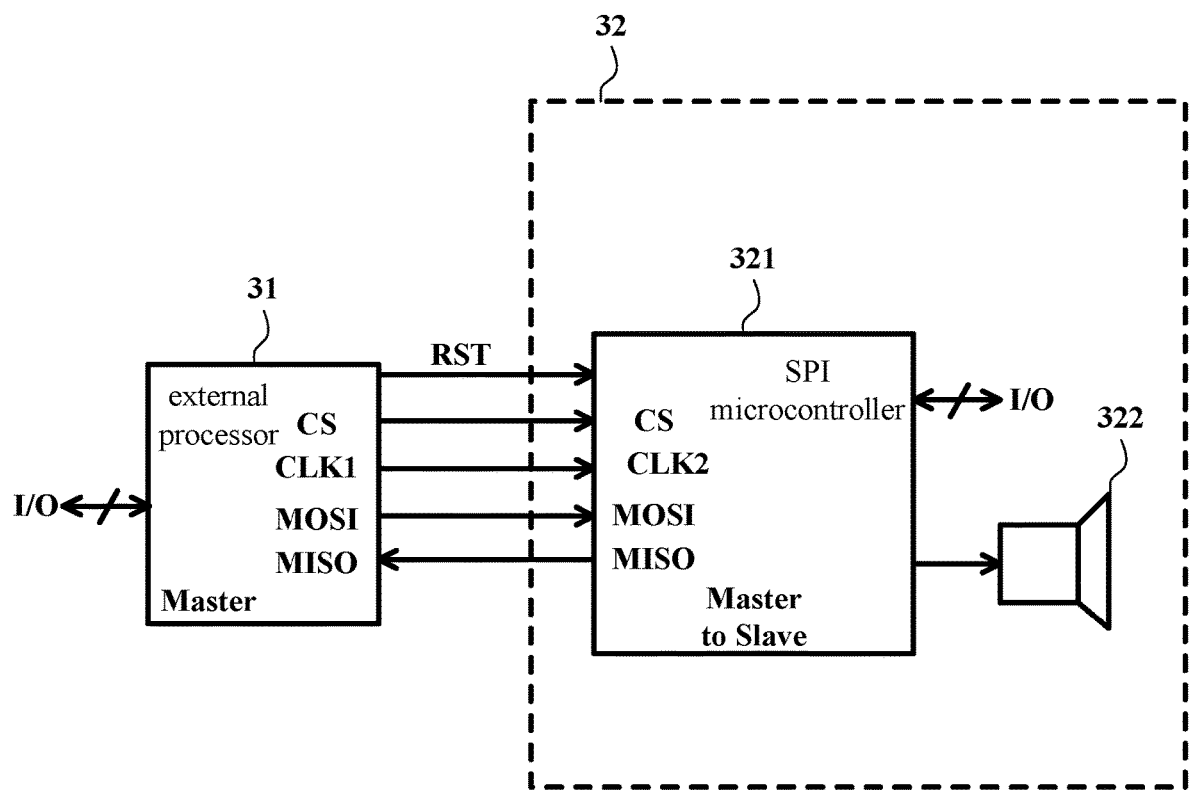
FIG. 3 illustrates a circuit block diagram depicting an embedded system according to a preferred embodiment of the present invention.

FIG. 3 illustrates a circuit block diagram depicting an embedded system according to a preferred embodiment of the present invention. Referring to FIG. 3, the embedded system includes a master central process unit 31 and a SPI peripheral device 32. The master central process unit 31 includes a serial peripheral interface port (SPI port), wherein the serial peripheral interface port includes a SPI MOSI (master out slave in) terminal (MOSI), a SPI MISO (master in slave out) terminal (MISO), a SPI clock terminal (CLK1) and a SPI enable terminal (CS).

The SPI peripheral device 32 includes a SPI microcontroller 321 and a peripheral element 322. The SPI microcontroller 321 includes a first serial peripheral interface port, wherein the first serial peripheral interface port includes a first SPI MOSI terminal (MOSI), a first SPI MISO terminal (MISO), a first SPI clock terminal (CLK2) and a first SPI enable terminal (CS).

The first SPI MOSI terminal (MOSI) of the SPI microcontroller 321 is coupled to the SPI MOSI terminal (MOSI) of the master central process unit 31. The first SPI MISO terminal (MISO) of the SPI microcontroller 321 is coupled to the SPI MISO terminal (MISO) of the master central process unit 31. The first SPI clock terminal (CLK2) of the SPI microcontroller 321 is coupled to the SPI clock terminal (CLK1) of the master central process unit 31. The first SPI enable terminal (CS) of the SPI microcontroller 321 is coupled to the SPI enable terminal (CS) of the master central process unit 31.

In this embodiment, the master central process unit 31 operates on a first operational clock (CLK1), and the SPI microcontroller 321 operates on a second operational clock (CLK2). Generally speaking, the serial peripheral interface port of the SPI microcontroller 321 has a minimum operating clock of 5 MHz, while the master central process unit 31 does not necessarily operate at such a high frequency.

In addition, the SPI microcontroller 321 of the general SPI peripheral device 32 needs to receive the program code to run the peripheral element 322, so in the prior art, after the boot, the SPI microcontroller 321 completes the POR (Power-On Reset) procedure, it will request the program code data from the master central process unit 31 at the operating speed of the clock frequency of at least 5 MHz. However, in this embodiment, it is assumed that the hardware specification of the master central process unit 31 does not meet the requirements, so that the master central process unit 31 may not complete the power-on reset procedure, or even if the master central process unit 31 completes the power-on reset procedure, the program also cannot parse the requested data address. Therefore, in this embodiment, the master central process unit 31 sends the reset signal RST to the reset terminal of the SPI microcontroller 321, and at the same time, the master central process unit 31 also sets its SPI MOSI terminal (MOSI) and SPI MISO terminal (MISO) to the logic high voltage.

After the SPI microcontroller 321 receives the reset signal RST, once again the SPI microcontroller 321 performs the power-on reset procedure. At this time, the first SPI enable terminal is in the disabled state (generally logic high voltage). Due to the specification of the serial peripheral interface, when the SPI enable terminal is in the disabled state, the corresponding slave device must set the SPI MOSI terminal (MOSI), SPI MISO terminal (MISO) and SPI clock terminal to the high impedance state. The first SPI MOSI terminal (MOSI) and the first SPI MISO terminal (MISO) of the SPI microcontroller 321 in the preset master mode are all electrically connected with discharge resistors respectively. Therefore, if the device connected to the first serial peripheral interface port is the slave mode, a logic low voltage on the first SPI MOSI terminal (MOSI) and the first SPI MISO terminal (MISO) should be detected since the high impedance terminals should be discharged to logic low voltage by electrically connected discharge resistors. However, at this time, the logic high voltage output by the master central process unit 31 on the first SPI MOSI terminal (MOSI) and first SPI MISO terminal (MISO) of the SPI microcontroller 321 is detected, thus, the SPI microcontroller 321 sets the first serial peripheral interface port from the preset master mode to slave mode, and the master central process unit 31 operates on the first operational clock (CLK1), and transmits the code to the SPI microcontroller 321 according to the first operational clock (CLK1). After that, whether the master central process unit 31 transmits data to the first serial peripheral interface port of SPI microcontroller 321 or receives data from the first serial peripheral interface port of SPI microcontroller 321, the data transmission utilizes the first operational clock (CLK1) which the master central process unit 31 operates on.

In the above-mentioned embodiment, the SPI microcontroller 321 operates in slave mode for the master central process unit 31. However, for the peripheral element 322 to which the SPI microcontroller 321 is coupled, the SPI microcontroller 321 is still in master mode.

In the above-mentioned embodiment, the first SPI MOSI terminal (MOSI) and the first SPI MISO terminal (MISO) of the SPI microcontroller 321 respectively have discharge resistors. People having ordinary skill in the art should know that the discharge resistors can not only be built in the inside of the SPI microcontroller 321, but also can be respectively coupled to the transmission lines of the SPI MOSI terminal (MOSI) and the first SPI MISO terminal (MISO), so the present invention is not limited thereto.

Furthermore, in the above-mentioned embodiment, the first SPI MOSI terminal (MOSI) and the first SPI MISO terminal (MISO) are pre-discharged to the logic low voltage and when logic high voltage is detected, the SPI microcontroller 321 would be set to slave mode. However, people having ordinary skill in the art should know that if the first SPI MOSI terminal (MOSI) and the first SPI MISO terminal (MISO) are pre-charged to a logic high voltage, the designer can also design the master central process unit 31 output logic low voltage from the SPI MOSI terminal (MOSI) and SPI MISO terminal (MISO), such that the SPI microcontroller 321 enter slave mode when the SPI microcontroller 321 detects the logic low voltage on at least one of the SPI MOSI terminal (MOSI) and SPI MISO terminal (MISO) of the SPI microcontroller 321. This is a design choice according to the essence of the present invention. Thus, the present invention is not limited thereto.

In addition, in the above-mentioned embodiment, when the SPI microcontroller 321 detects the logic high voltage output by the master central process unit 31 on the first SPI MOSI terminal (MOSI) and the first SPI MISO terminal (MISO) of the SPI microcontroller 321, the SPI microcontroller 321 sets the first serial peripheral interface port as slave. However, in fact, during the design, the SPI microcontroller 321 can be designed to enter the slave mode as long as one of the three terminals (first SPI MOSI terminal, first SPI MISO terminal and first SPI clock terminal) is a logic high voltage during power-on reset. Similarly, the master central process unit 31 can only set one of its SPI MOSI terminal (MOSI), SPI MISO terminal (MISO) or SPI clock terminal to logic high voltage. The above-mentioned embodiments of the present invention are only for people having ordinary skill in the art to understand the spirit of the present invention. However, the present invention is not limited thereto. For the same reason, in the above-mentioned embodiment, the present invention can also be implemented by changing the logic high voltage to the logic low voltage, so the present invention is not limited thereto. In addition, in a preferred embodiment, the discharge resistor can also be set in the first SPI clock terminal of the SPI microcontroller 321. The present invention is not limited thereto.

Figure 4:
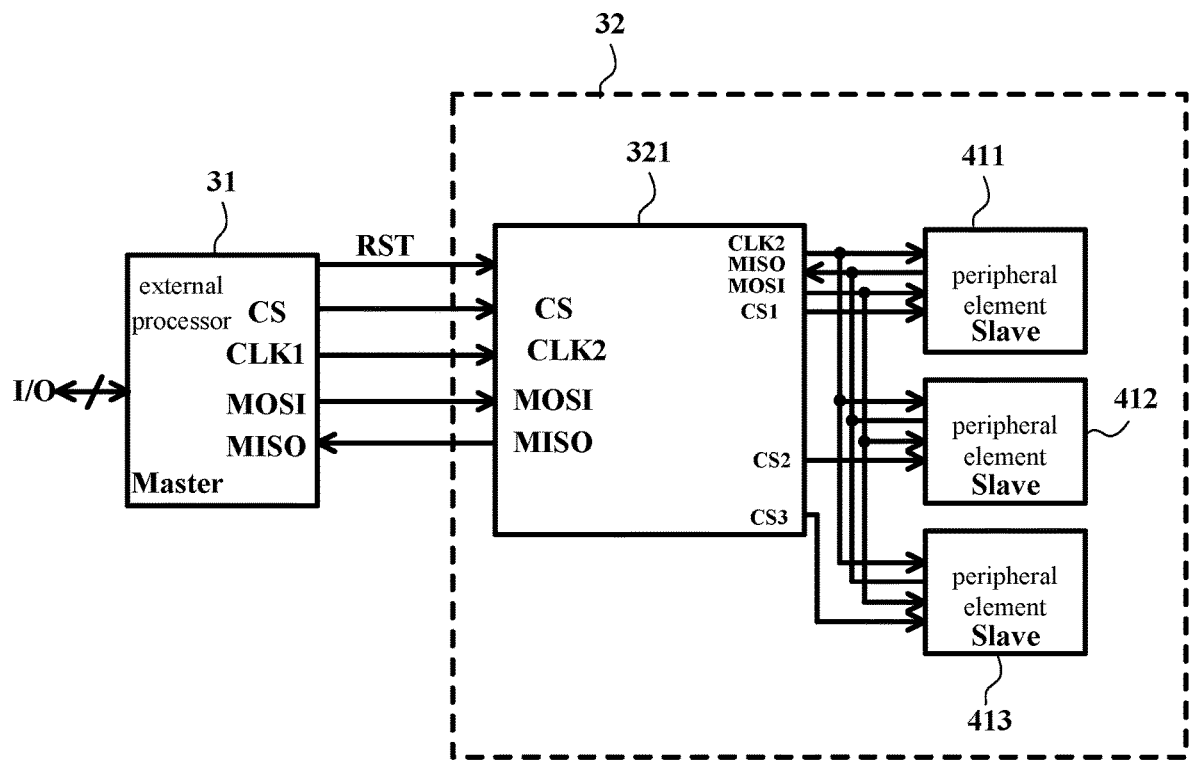
FIG. 4 illustrates a circuit block diagram depicting an embedded system according to a preferred embodiment of the present invention.

FIG. 4 illustrates a circuit block diagram depicting an embedded system according to a preferred embodiment of the present invention. Referring to FIG. 4, in this embodiment, the embedded system includes a master central process unit 31 and an SPI peripheral device 32. The master central process unit 31 also includes a serial peripheral interface port (SPI port). The SPI peripheral device 32 includes an SPI microcontroller 321 and three peripheral elements 411-413. The three peripheral elements 322 are respectively coupled to the second serial peripheral interface port. The second serial peripheral interface port includes a second SPI MOSI terminal MOSI2, a second SPI MISO terminal MISO2, a second SPI clock terminal CLK2 and three second SPI enable terminals CS1-CS3. Each peripheral element 411-413 is independently coupled to a second SPI enable terminal CS1-CS3 correspondingly.

In the above-mentioned embodiment, that for the master central process unit 31, the SPI microcontroller 321 of the SPI peripheral device 32 is the slave device, but for the SPI microcontroller 321, the three peripheral elements 411 to 413 are all in the slave mode, and for the three peripheral elements 411 to 413, the SPI microcontroller 321 is the master device. In this embodiment, the master central process unit 31 still uses the reset signal RST and the first SPI MOSI terminal (MOSI) and the first SPI MISO terminal (MISO) of the above-mentioned embodiment to be set to a logic high voltage, so that the SPI microcontroller 321 is switched from master mode to slave mode. Since the similar operation in the above-mentioned embodiment has already described, the detail description is omitted. Similarly, as mentioned above, the first SPI clock terminal can also be used to determine whether the SPI microcontroller 321 switches from master mode to slave mode or not. Since the similar operation in the above-mentioned embodiment has already been described, the detail description is omitted.

Figure 5A:
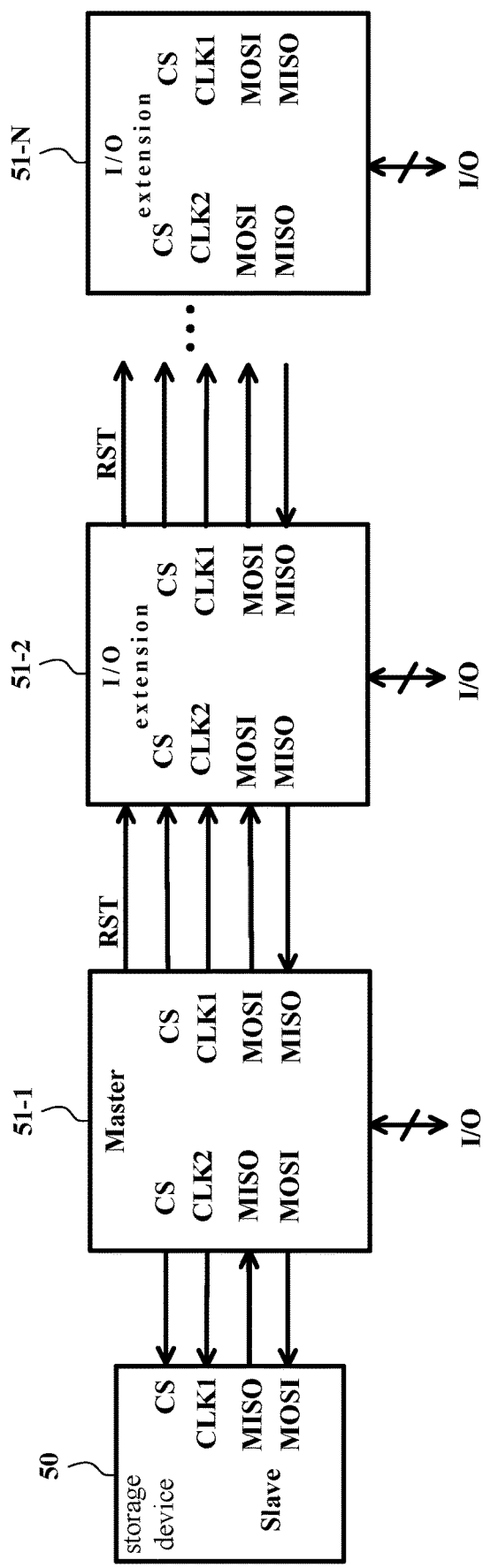
FIG. 5A illustrates a circuit block diagram depicting an embedded system according to a preferred embodiment of the present invention.

FIG. 5A illustrates a circuit block diagram depicting an embedded system according to a preferred embodiment of the present invention. Referring to FIG. 5A, in this embodiment, the SPI microcontroller 51-1 is used as the master central process unit, and the storage device 50 stores the operation code. In addition, each SPI microcontroller 51-1~51-N has an independent first serial peripheral interface port (SPI port) and an independent third serial peripheral interface port (SPI port), each independent serial peripheral interface port (SPI port) has a SPI MOSI terminal (MOSI), a SPI MISO terminal (MISO), a SPI clock terminal CLK2 and a SPI enable terminal CS. In addition, each SPI microcontroller 51-1~51-N respectively represents an independent SPI peripheral device.

The first SPI MOSI terminal of the first serial peripheral interface port of the SPI microcontroller 51-(K+1) of the $(K+1)^{th}$ SPI peripheral device is coupled to the third SPI MOSI terminal of the third serial peripheral interface port of the SPI microcontroller 51-K of the $K^{th}$ SPI peripheral device. The first SPI MISO terminal of the first serial peripheral interface port of the SPI microcontroller 51-(K+1) of the $(K+1)^{th}$ SPI peripheral device is coupled to the third SPI MISO terminal of the third serial peripheral interface port of the SPI microcontroller 51-K of the $K^{th}$ SPI peripheral device.

The first SPI clock terminal of the first serial peripheral interface port of the SPI microcontroller 51-(K+1) of the $(K+1)^{th}$ SPI peripheral device is coupled to the third SPI clock terminal of the third serial peripheral interface port of the SPI microcontroller 51-K of the $K^{th}$ SPI peripheral device. The first SPI enable terminal of the first serial peripheral interface port of the SPI microcontroller 51-(K+1) of the $(K+1)^{th}$ SPI peripheral device is coupled to the third SPI enable terminal of the third serial peripheral interface port of the SPI microcontroller 51-K of the $K^{th}$ SPI peripheral device.

In addition, the SPI microcontroller 51-K of the $K^{th}$ SPI peripheral device outputs a reset signal RST to the reset terminal of the SPI microcontroller 51-(K+1) of the $(K+1)^{th}$ SPI peripheral device. With this series electrical connection, the SPI microcontrollers of the SPI peripheral devices are sequentially reset, and the SPI microcontrollers of the SPI peripheral devices are sequentially set to slave mode.

From the above-mentioned embodiment, people having ordinary skill in the art should know that by using the serial electrical connection method, the design of the embodiment can be expanded to control more peripheral devices.

Figure 5B:
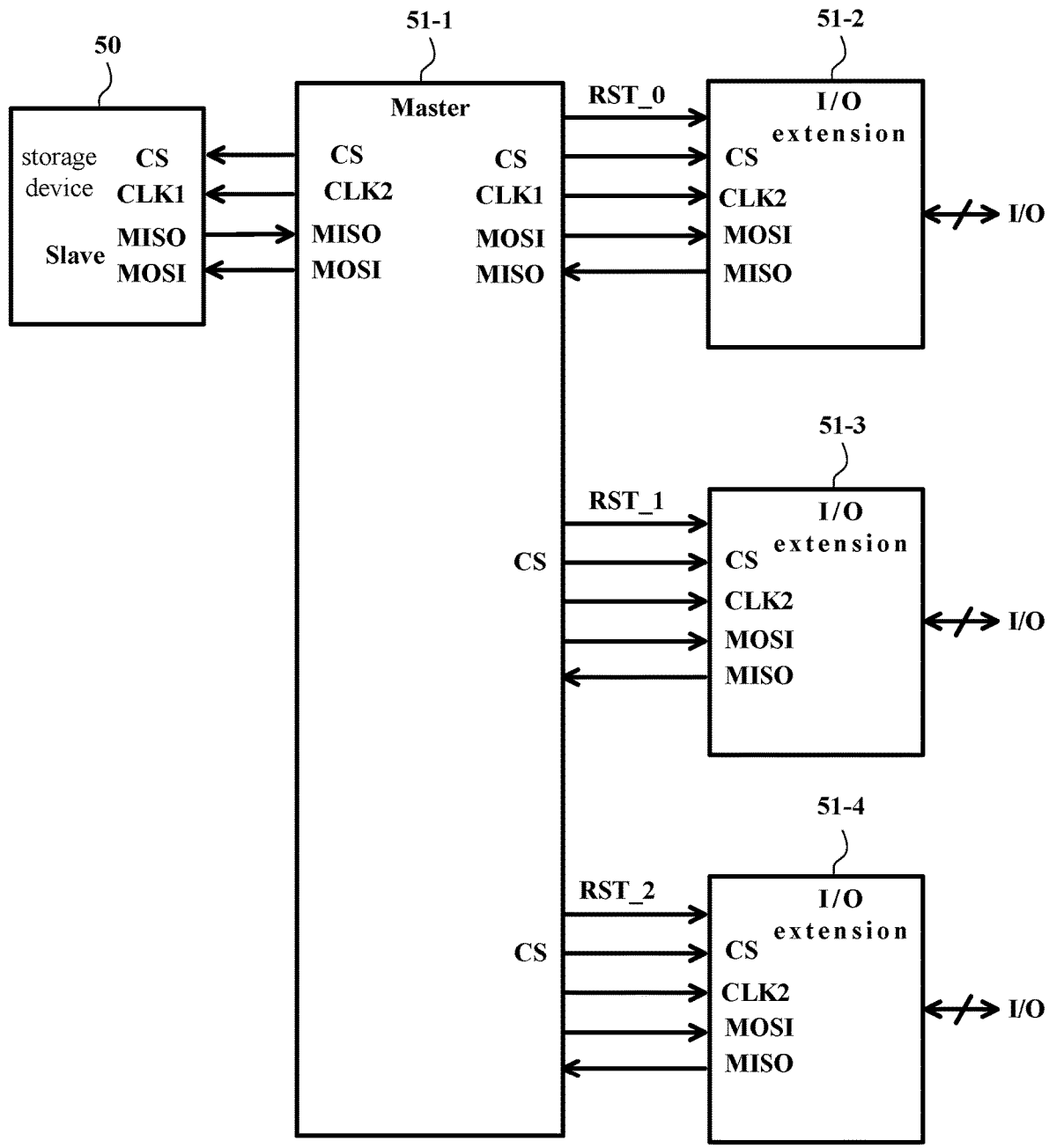
FIG. 5B illustrates a circuit block diagram depicting an embedded system according to a preferred embodiment of the present invention.

FIG. 5B illustrates a circuit block diagram depicting an embedded system according to a preferred embodiment of the present invention. Referring to FIG. 5A and FIG. 5B, the difference between the embodiment in FIG. 5B and the embodiment in FIG. 5A is that the parallel electrical connection is configured in FIG. 5B. In this embodiment, the SPI microcontroller 51-1 is also used as the master central process unit, and the storage device 50 is for storing the program code for operation. In addition, each SPI microcontroller 51-1~51-3 has an independent first serial peripheral interface port (SPI port). The main control SPI microcontroller 51-1 has three serial peripheral interface ports (SPI ports) that are electrically connected to the SPI microcontrollers 51-2 to 51-4 respectively. The main control SPI microcontroller 51-1 outputs three reset signals RST_0~RST_2 respectively, which are used to reset the SPI microcontroller 51-2~51-4 in sequence, the SPI microcontroller 51-2~51-4 is set to slave mode as described in the above-mentioned method in the abovementioned embodiment. After that, SPI microcontroller 51-1 sequentially enables SPI microcontroller 51-2~51-4, and transmits data to SPI microcontroller 51-2~51-4 in sequence.

Figure 5C:
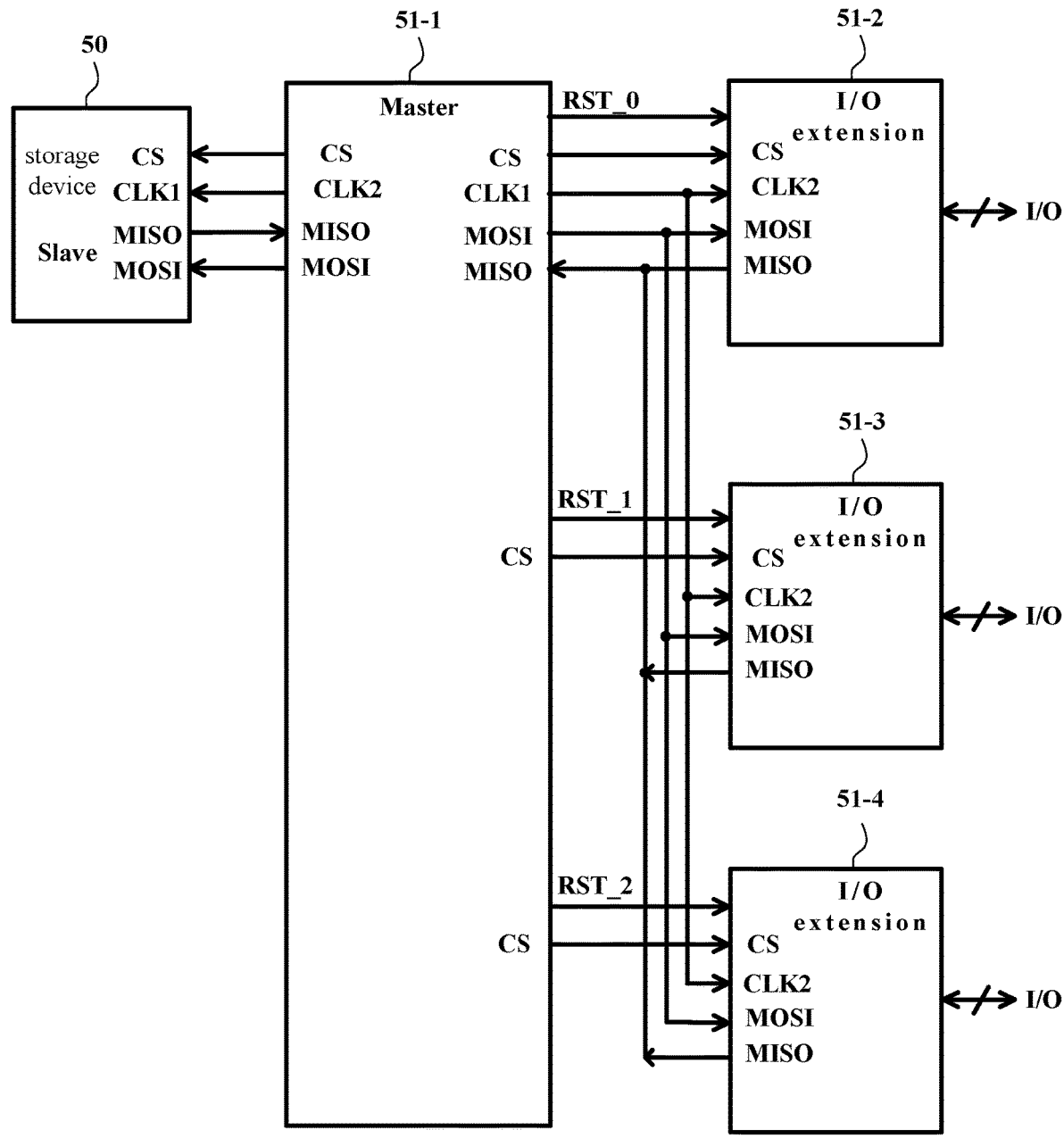
FIG. 5C illustrates a circuit block diagram depicting an embedded system according to a preferred embodiment of the present invention.

People having ordinary skill in the art should know that the design of the above-mentioned embodiment can be changed from the three SPI ports to one SPI port, each MOSI terminal of the three SPI microcontrollers 51-2~51-4 is electrically connected to the MOSI terminal of the SPI port of the main control SPI microcontroller 51-1, and each MISO terminal of the three SPI microcontrollers 51-2~51-4 is electrically connected to the MISO terminal of the SPI port of the main control SPI microcontroller 51-1. And, the three enable terminals CS of the main control SPI microcontroller 51-1 are respectively coupled to each enable terminal CS of the three SPI microcontroller 51-2~51-4 independently. As shown in FIG. 5C, FIG. 5C illustrates a circuit block diagram depicting an embedded system according to a preferred embodiment of the present invention. After the POR (power-on reset), the operation would be similar to elements in the SPI peripheral device 32 in FIG. 4. Thus, the detail description is omitted.

Figure 6A:
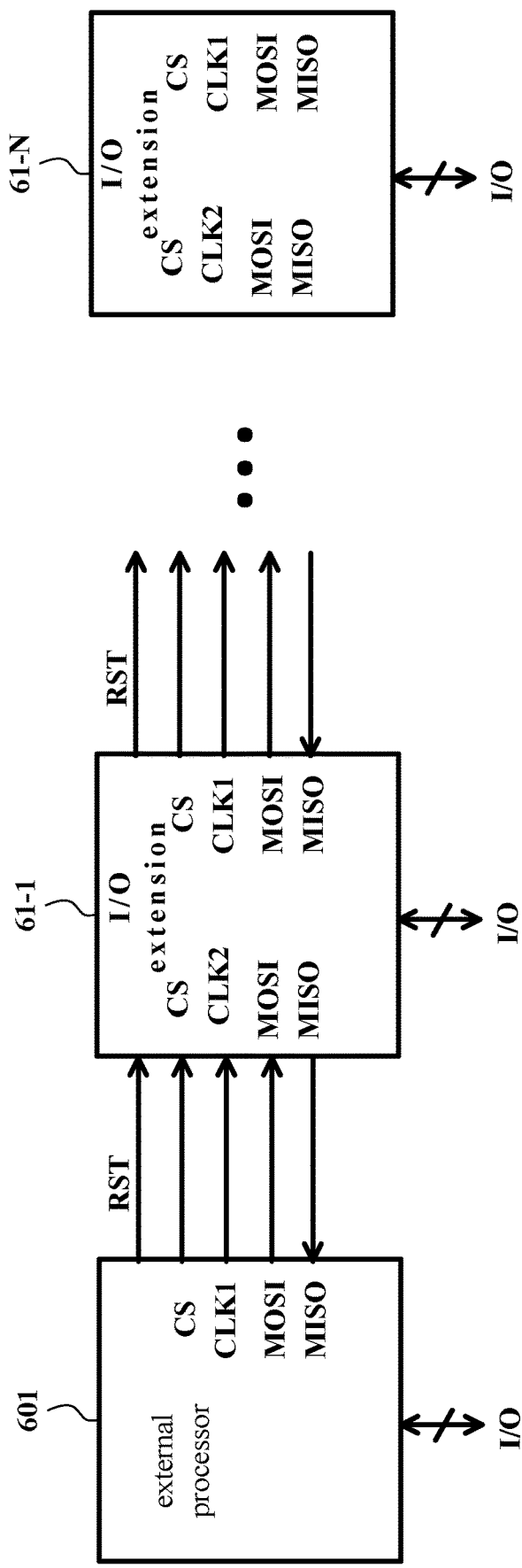
FIG. 6A illustrates a circuit block diagram depicting an embedded system according to a preferred embodiment of the present invention.

FIG. 6A illustrates a circuit block diagram depicting an embedded system according to a preferred embodiment of the present invention. Referring to FIG. 6A, in this embodiment, the external master central process unit 601 controls a plurality of SPI peripheral devices SPI microcontrollers 61-1~61-N. Similarly, each SPI microcontroller 61-1~61-N respectively has an independent first serial peripheral interface port (SPI port) and an independent third serial peripheral interface port (SPI port), each independent serial peripheral interface port (SPI port) all have SPI MOSI terminal (MOSI), SPI MISO terminal (MISO), SPI clock terminal CLK2 and SPI enable terminal CS. In addition, each SPI microcontroller 61-1~61-N respectively represents an independent SPI peripheral device.

For the same reason, from the above-mentioned embodiments, people having ordinary skill in the art should know that by using the serial electrical connection method, the design of the embodiment can be expanded to control more peripheral devices. Also, the master central process unit 601 is not limited to an SPI microcontroller.

Figure 6B:
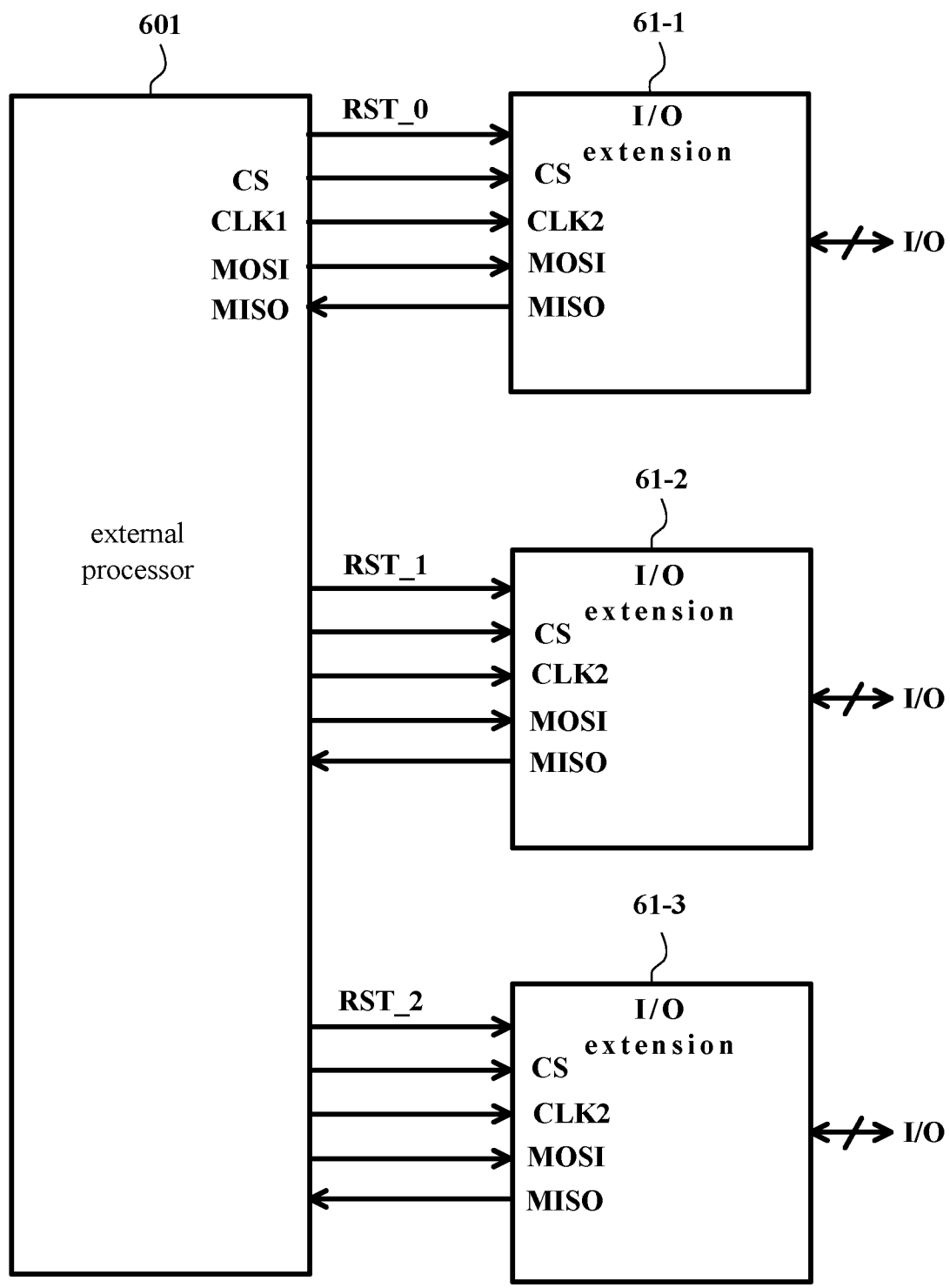
FIG. 6B illustrates a circuit block diagram depicting an embedded system according to a preferred embodiment of the present invention.

FIG. 6B illustrates a circuit block diagram depicting an embedded system according to a preferred embodiment of the present invention. Referring to FIG. 5A, FIG. 6A and FIG. 6B, the difference between the embodiment in FIG. 6B and the embodiment in FIG. 5A and FIG. 6A is that FIG. 6B adopts a parallel electrical connection. In this embodiment, the external master central process unit 601 is also used as the master central process unit. In addition, each SPI microcontroller 61-1~61-3 has an independent first serial peripheral interface port (SPI port). The master central process unit 601 of the main control has three serial peripheral interface ports (SPI ports) which are electrically connected to the SPI microcontrollers 61-1 to 61-3 respectively. The master central process unit 601 outputs three reset signals RST_0~RST_2 to respectively reset the SPI microcontroller 61-1~61-3 in sequence. And the SPI microcontrollers 61-1~61-3 is set to slave mode according to the method described in the above-mentioned embodiment. After that, the master central process unit 601 enables the SPI microcontrollers 61-1 to 61-3 in sequence, and transmits data to the SPI microcontrollers 61-1 to 61-3 in sequence.

Figure 6C:
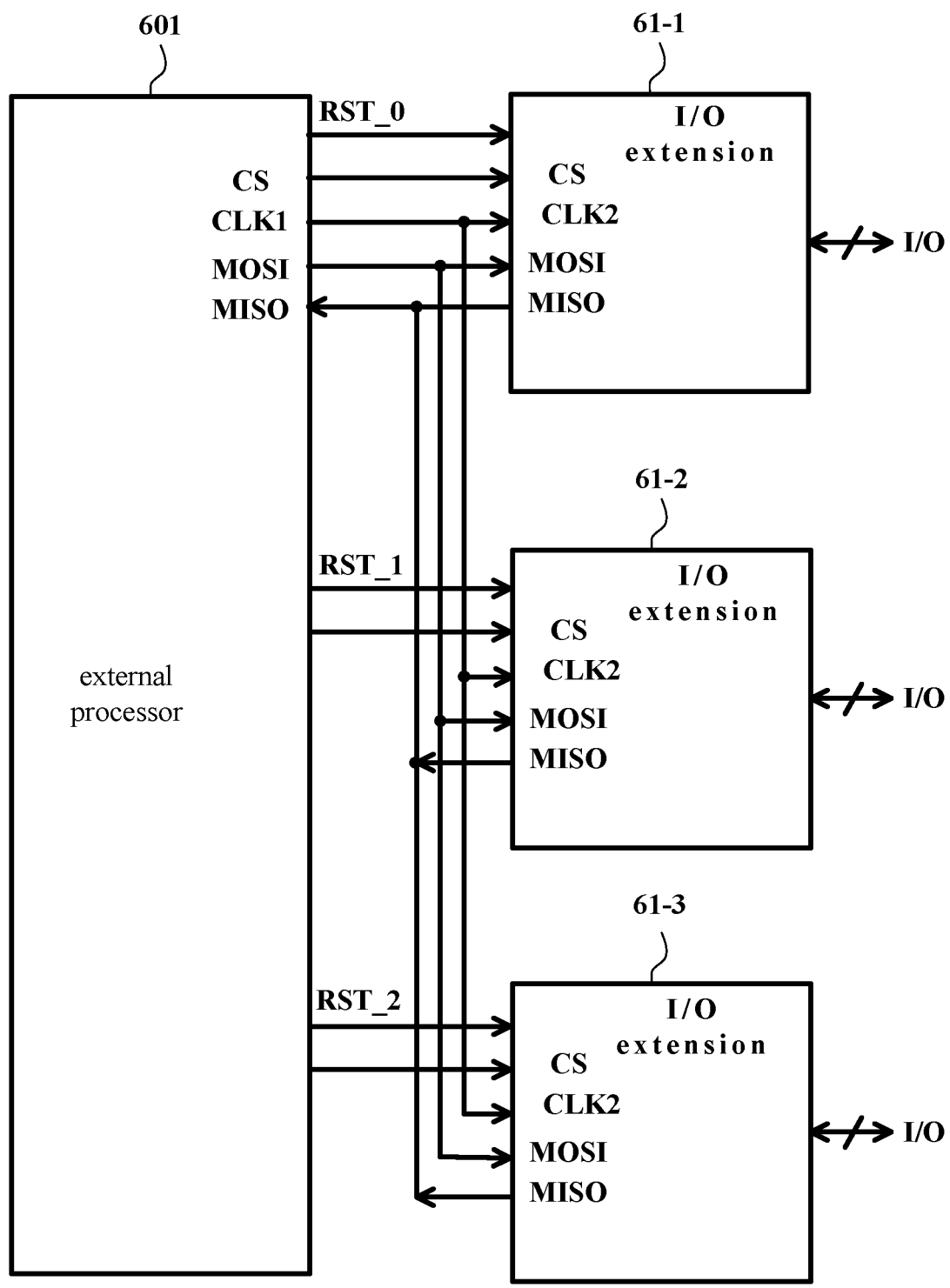
FIG. 6C illustrates a circuit block diagram depicting an embedded system according to a preferred embodiment of the present invention.

People having ordinary skill in the art should know that the design of the above-mentioned embodiment can be changed from the three SPI ports to one SPI port, each MOSI terminal of the three SPI microcontrollers 61-1~61-3 is electrically connected to the MOSI terminal of the SPI port of the external master central process unit 601 and each MISO terminal of the three SPI microcontrollers 61-1~61-3 is electrically connected to the MISO terminal of the SPI port of the external master central process unit 601. And, the three enable terminals CS of the external master central process unit 601 are respectively coupled to each enable terminal CS of the three SPI microcontroller 61-1~61-3 independently. As shown in FIG. 6C, FIG. 6C illustrates a circuit block diagram depicting an embedded system according to a preferred embodiment of the present invention. After the POR (power-on reset), the operation would be similar to elements in the SPI peripheral device 32 in FIG. 4. Thus, the detail description is omitted.

In the above-mentioned embodiments in FIG. 5B and FIG. 6B use three reset signals RST_0 to RST_2 respectively to reset three SPI microcontrollers. However, people having ordinary skill in the art should know that one reset signal RST can be provide to the three SPI microcontrollers, and the three SPI microcontrollers can be simultaneously power-on reset (Power on Reset). Further, when at least one of MOSI, MISO, and CLK terminals is set to a logic high voltage and detected by the three SPI microcontrollers during power-on reset, all three SPI microcontrollers can enter the slave mode (Slave Mode). Moreover, according to the above description of three SPI microcontrollers, people having ordinary skill in the art should know that two or a plurality of SPI microcontrollers can also be implemented according to the essence of the present invention. Thus, the present invention is not limited thereto.

Similarly, the above description is based on "logic high voltage", people having ordinary skill in the art should know that "logic high voltage" and "logic low voltage" are only design choices. If MOSI, MISO, CLK terminals are coupled to charging circuit, each terminal will be charged to "logic high voltage" in the case of high impedance, the master central process unit 601 or the SPI microcontroller 51-1 can also set at least one of MOSI, MISO, CLK terminal to a logic low voltage, and the three coupled SPI microcontrollers detects the logic low voltage to enter the slave mode. Therefore, the above description is only for people having ordinary skill in the art to understand the essence of the present invention. Thus the present invention is not limited thereto.

Figure 7:
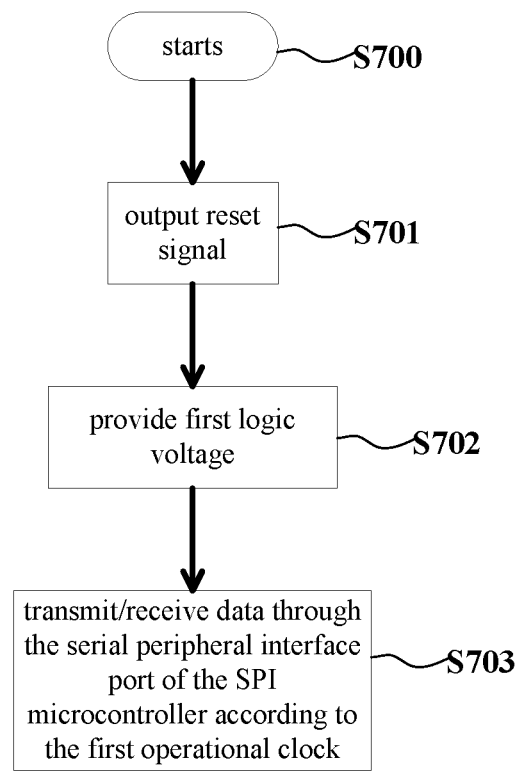
FIG. 7 illustrates a flowchart depicting the operation of a master central process unit in the serial peripheral interface compatibility extension switching method according to a preferred embodiment of the present invention.

FIG. 7 illustrates a flowchart depicting the operation of a master central process unit in the serial peripheral interface compatibility extension switching method according to a preferred embodiment of the present invention. Referring to FIG. 7, the operation of the master central process unit in the serial peripheral interface compatibility extension switching method includes the steps as follow.

In step S700, the method starts.

In step S701, a reset signal is output. Thus, the SPI microcontroller performs a power-on reset (POR).

In step S702, a first logic voltage is provided to the SPI MOSI terminal and the SPI MISO terminal of the serial peripheral interface port of the SPI microcontroller. Similarly, the step can be modified as follow: "a first logic voltage is provided to at least one of the SPI MOSI terminal, the SPI MISO terminal and SPI clock terminal of the serial peripheral interface port of the SPI microcontroller." In the implementation, the SPI microcontroller can determine to enter the slave mode if only one of the SPI MOSI terminal, the SPI MISO terminal and SPI clock terminal is first logic voltage.

In step S703, data is transmitted/received through the serial peripheral interface port of the SPI microcontroller according to the first operational clock.

Figure 8:
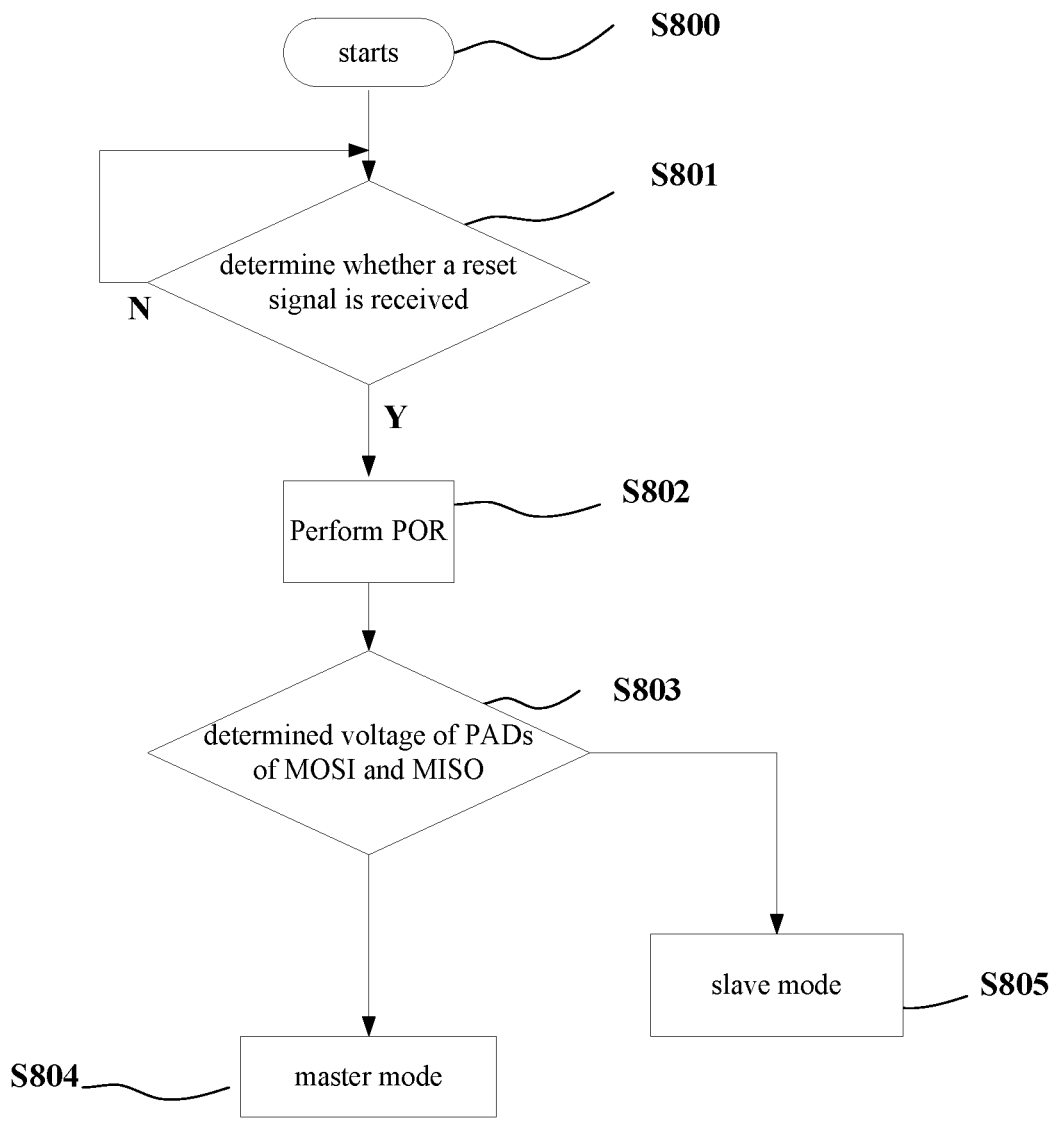
FIG. 8 illustrates a flowchart depicting the operation of a SPI microcontroller in the serial peripheral interface compatibility extension switching method according to a preferred embodiment of the present invention.

FIG. 8 illustrates a flowchart depicting the operation of a SPI microcontroller in the serial peripheral interface compatibility extension switching method according to a preferred embodiment of the present invention. Referring to FIG. 8, the operation of the SPI microcontroller in the serial peripheral interface compatibility extension switching method includes the steps as follow.

In step S800, the method starts.

In step S801, it is determined whether a reset signal is received. If the reset signal is received, the step S802 is performed.

In step S802, a power-on reset (POR) is performed.

In step S803, it is determined the voltage of the PADs of the SPI MOSI terminal and SPI MISO terminal of the serial peripheral interface port of the SPI microcontroller. When the voltage is the second logic voltage, the step S804 is performed. When the voltage is the first logic voltage, the step S805 is performed. Similarly, in this embodiment, the step S803 can be modified as follow: "it is determined the voltage on at least one of the PADs of the SPI MOSI terminal, the SPI MISO terminal and SPI clock terminal of the serial peripheral interface port of the SPI microcontroller." As long as the voltage of one of the PADs is the first logic voltage, step S805 is performed.

In step S804, the master mode is adopted, and the program code data address is transmitted according to the second operational clock and the program code data is received according to the second operational clock.

In step S805, the slave mode is entered. The program code data is received from the external master central process unit according to the first operational clock when the SPI port is enabled by the external master central process unit.

In summary, the essence of the present invention is to determine whether the SPI microcontroller is converted into the master mode or the slave mode according to the logic state of the input/output terminals of the serial peripheral interface when the serial peripheral interface is not selected. When the SPI microcontroller is coupled to other control chip, the other chips can work in the serial peripheral interface master mode, and the hardware and performance thresholds of the other chip are reduced. Therefore, the compatibility of the device can be increased.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An embedded system, comprising:
a master central process unit, comprising a first serial peripheral interface port, wherein the serial peripheral interface port comprises:
 a SPI MOSI terminal;
 a SPI MISO terminal;
 a SPI clock terminal; and
 a SPI enable terminal; and
a SPI peripheral device, comprising:
 a SPI microcontroller, comprising at least a first serial peripheral interface port, wherein the first serial peripheral interface port comprises:
  a first SPI MOSI terminal, coupled to the SPI MOSI terminal of the master central process unit;
  a first SPI MISO terminal, coupled to the SPI MISO terminal of the master central process unit;
  a first SPI clock terminal, coupled to the SPI clock terminal of the master central process unit; and
  a first SPI enable terminal, coupled to the SPI enable terminal of the master central process unit;
 wherein the master central process unit is operated at a first operational clock, and the SPI microcontroller is operated at a second operational clock,
 wherein the SPI microcontroller is initially configured as a master device operating at a second operational clock, and the master central process unit is initially configured as a slave device;
 when the master central process unit in a reset period sends a reset signal to the SPI microcontroller, the master central process unit coercively sets at least one of the SPI MOSI terminal, the SPI MISO terminal, and the SPI clock terminal to a first logic voltage in order to switch the SPI microcontroller to slave mode,
 when the first SPI enable terminal of the SPI microcontroller is disabled, and the SPI microcontroller detects that at least one of the first SPI MOSI terminal, the first SPI MISO terminal and the first SPI clock terminal is at the first logic voltage, the first serial peripheral interface port of the SPI microcontroller is reconfigured to operate in slave mode, such that the SPI microcontroller receives data from the SPI MOSI terminal of the master central process unit according to the first operational clock of the master central process unit.

2. The embedded system according to claim 1, wherein the SPI microcontroller further comprises:
a second serial peripheral interface port, comprising:
 a second SPI MOSI terminal;
 a second SPI MISO terminal;
 a second SPI clock terminal; and
 a plurality of second SPI enable terminal.

3. The embedded system according to claim 2, wherein the second serial peripheral interface port is further coupled to a plurality of slave peripheral device, wherein the $I^{th}$ slave peripheral device is coupled to the $I^{th}$ third SPI enable terminal, wherein I is natural number, and I is smaller than or equal to a number of the second SPI enable terminal.

4. The embedded system according to claim 1, wherein the SPI microcontroller further comprises a reset terminal, wherein, when the SPI microcontroller performs a power-on reset, the master central process unit outputs a reset signal to the reset terminal, and outputs the first logic voltage to at least one of the SPI MOSI terminal, the SPI MISO terminal and the SPI clock terminal of the master central process unit.

5. The embedded system according to claim 1, wherein the embedded system comprises:
a plurality of SPI peripheral device, wherein each SPI peripheral device comprises:
 a SPI microcontroller, comprising a first serial peripheral interface port and a third serial peripheral interface port, wherein the SPI microcontroller first serial peripheral interface port comprises:
  a first SPI MOSI terminal;
  a first SPI MISO terminal;
  a first SPI clock terminal;
  a first SPI enable terminal;
 wherein the SPI microcontroller third serial peripheral interface port comprises:
  a third SPI MOSI terminal;
  a third SPI MISO terminal;
  a third SPI clock terminal;
  a third SPI enable terminal;
 wherein the first SPI MOSI terminal of the first serial peripheral interface port of the SPI microcontroller of $(J+1)^{th}$ SPI peripheral device is coupled to the third SPI MOSI terminal of the third serial peripheral interface port of the SPI microcontroller of $J^{th}$ SPI peripheral device,
 wherein the first SPI MISO terminal of the first serial peripheral interface port of the SPI microcontroller of $(J+1)^{th}$ SPI peripheral device is coupled to the third SPI MISO terminal of the third serial peripheral interface port of the SPI microcontroller of $J^{th}$ SPI peripheral device,
 wherein the first SPI clock terminal of the first serial peripheral interface port of the SPI microcontroller of $(J+1)^{th}$ SPI peripheral device is coupled to the third SPI clock terminal of the third serial peripheral interface port of the SPI microcontroller of $J^{th}$ SPI peripheral device,
 wherein the first SPI enable terminal of the first serial peripheral interface port of the SPI microcontroller of $(J+1)^{th}$ SPI peripheral device is coupled to the third SPI enable terminal of the third serial peripheral interface port of the SPI microcontroller of $J^{th}$ SPI peripheral device,
wherein J is natural number, and J is smaller than a number of the SPI peripheral device.

6. The embedded system according to claim 5, wherein the SPI microcontroller of each SPI peripheral device further comprises a reset terminal,
wherein, when the embedded system is started, the SPI microcontroller of Jth SPI peripheral device outputs a reset signal to the reset terminal of the SPI microcontroller of $(J+1)^{th}$ SPI peripheral device, and one of the third SPI MOSI terminal, the third SPI MISO terminal and the third SPI clock terminal of the SPI microcontroller of the $J^{th}$ SPI peripheral device outputs the first logic voltage.

7. The embedded system according to claim 1, wherein the first SPI MOSI terminal of the first serial peripheral interface port of the SPI microcontroller is coupled to a second logic voltage holding circuit,
wherein, when a circuit coupled to the first SPI MOSI terminal is high impedance, the first SPI MOSI terminal of the first serial peripheral interface port of the SPI microcontroller is set to a second logic voltage.

8. The embedded system according to claim 1, wherein the first SPI MISO terminal of the first serial peripheral interface port of the SPI microcontroller is coupled to a second logic voltage holding circuit,
wherein, when a circuit coupled to the first SPI MISO terminal is high impedance, the first SPI MISO terminal of the first serial peripheral interface port of the SPI microcontroller is set to second logic voltage.

9. The embedded system according to claim 1, wherein a frequency of the first operational clock is different from a frequency of the second operational clock.

10. A serial peripheral interface compatibility extension switching method, adapted for an embedded system, wherein the serial peripheral interface compatibility extension switching method comprises:
providing a master central process unit, operated at a first operational clock;
providing a SPI microcontroller, operated at a second operational clock;
configuring the SPI microcontroller initially as a master device;
performing a power-on reset to the SPI microcontroller by the master central process unit so that a first SPI enable terminal of the SPI microcontroller is disabled;
coercively providing a first logic voltage to at least one of a SPI MOSI terminal, a SPI MISO terminal, a SPI clock terminal of a serial peripheral interface port of the SPI microcontroller in order to switch the SPI microcontroller to slave mode when the first SPI enable terminal of the SPI microcontroller is disabled; and
detecting a condition requiring the SPI microcontroller to switch to slave mode;
switching the serial peripheral interface port of the SPI microcontroller from master mode to slave mode upon detecting the condition; and
transmitting/receiving data from the serial peripheral interface port of the SPI microcontroller according to the first operational clock of the master central process unit.

11. The serial peripheral interface compatibility extension switching method according to claim 10, further comprising:

providing a second logic voltage holding circuit, coupled to the SPI MOSI terminal of a serial peripheral interface port of the SPI microcontroller,
wherein, when the SPI MOSI terminal of the serial peripheral interface port of the SPI microcontroller is high impedance, the SPI MOSI terminal of the serial peripheral interface port of the SPI microcontroller is set to a second logic voltage.

12. The serial peripheral interface compatibility extension switching method according to claim 10, further comprising:
providing a second logic voltage holding circuit, coupled to the SPI MISO terminal of a serial peripheral interface port of the SPI microcontroller,
wherein, when the SPI MISO terminal of the serial peripheral interface port of the SPI microcontroller is high impedance, the SPI MISO terminal of the serial peripheral interface port of the SPI microcontroller is set to a second logic voltage.

13. A serial peripheral interface compatibility extension switching method, adapted for an embedded system, wherein the serial peripheral interface compatibility extension switching method comprises:
providing a master central process unit, operated at a first operational clock;
providing a SPI microcontroller, operated at a second operational clock;
when the SPI microcontroller performs a power-on reset, determining whether one of a logic voltage of at least one of a SPI MOSI terminal, a SPI MISO terminal and a SPI clock terminal of a serial peripheral interface port of the SPI microcontroller is coercively set to a first voltage;
when the logic voltage of at least one of the SPI MOSI terminal, the SPI MISO terminal and the SPI clock terminal of the serial peripheral interface port of the SPI microcontroller is coercively set to the first logic voltage in order to switch the SPI microcontroller to slave mode, transmitting/receiving data from the serial peripheral interface port of the SPI microcontroller according to the first operational clock; and
when a first SPI enable terminal of the first serial peripheral interface port of the SPI microcontroller is disabled, and the SPI microcontroller detects that at least one of the SPI MOSI terminal, the SPI MISO terminal, and the SPI clock terminal is at the first logic voltage, reconfiguring the first serial peripheral interface port of the SPI microcontroller to operate in slave mode.

14. The serial peripheral interface compatibility extension switching method according to claim 13, further comprising:
providing a second logic voltage holding circuit, coupled to the SPI MOSI terminal of a serial peripheral interface port of the SPI microcontroller,
wherein, when the SPI MOSI terminal of the serial peripheral interface port of the SPI microcontroller is high impedance, the SPI MOSI terminal of the serial peripheral interface port of the SPI microcontroller is set to a second logic voltage.

15. The serial peripheral interface compatibility extension switching method according to claim 13, further comprising:
providing a second logic voltage holding circuit, coupled to the SPI MISO terminal of a serial peripheral interface port of the SPI microcontroller,
wherein, when the SPI MISO terminal of the serial peripheral interface port of the SPI microcontroller is high impedance, the SPI MISO terminal of the serial peripheral interface port of the SPI microcontroller is set to a second logic voltage.

* * * * *